United States Patent
Wigton et al.

(10) Patent No.: US 9,324,149 B2
(45) Date of Patent: Apr. 26, 2016

(54) METHOD AND USE OF SMARTPHONE CAMERA TO PREVENT DISTRACTED DRIVING

(71) Applicants: Joel David Wigton, Fort Collins, CO (US); Glenwood Garner, III, Raleigh, NC (US)

(72) Inventors: Joel David Wigton, Fort Collins, CO (US); Glenwood Garner, III, Raleigh, NC (US)

(73) Assignee: Joel David Wigton, Fort Collins, CO (US)

( * ) Notice: Subject to any disclaimer, the term of this patent is extended or adjusted under 35 U.S.C. 154(b) by 110 days.

(21) Appl. No.: 14/216,880

(22) Filed: Mar. 17, 2014

(65) Prior Publication Data

US 2015/0264558 A1    Sep. 17, 2015

(51) Int. Cl.
*G06T 7/00*    (2006.01)
*G06K 9/00*    (2006.01)

(52) U.S. Cl.
CPC .............. *G06T 7/004* (2013.01); *G06K 9/0061* (2013.01); *G06K 9/00604* (2013.01); *G06T 2207/20076* (2013.01); *G06T 2207/30201* (2013.01); *Y02B 60/50* (2013.01)

(58) Field of Classification Search
CPC . H04M 19/047; H04M 1/0272; H04W 24/04; H04W 84/00
USPC ........... 455/418, 344, 422.1, 450, 425, 556.1; 713/713
See application file for complete search history.

(56) References Cited

U.S. PATENT DOCUMENTS

| | | | |
|---|---|---|---|
| 7,636,340 B2 * | 12/2009 | Black .................... | G01D 21/00 348/158 |
| 7,856,203 B2 | 12/2010 | Lipovski | |
| 8,077,915 B2 | 12/2011 | Thorn | |
| 8,145,199 B2 | 3/2012 | Tadayon et al. | |
| 8,204,649 B2 | 6/2012 | Zhou et al. | |
| 8,290,509 B2 | 10/2012 | Jung et al. | |
| 8,295,854 B2 | 10/2012 | Osann | |
| 8,315,617 B2 | 11/2012 | Tadayon | |
| 8,320,884 B1 | 11/2012 | Khanna et al. | |
| 2008/0298571 A1 * | 12/2008 | Kurtz .................... | H04N 7/142 379/156 |
| 2010/0177035 A1 * | 7/2010 | Schowengerdt ........ | G06F 1/163 345/156 |
| 2010/0234047 A1 | 9/2010 | Lipovski | |
| 2010/0325411 A1 | 12/2010 | Jung et al. | |
| 2011/0021234 A1 | 1/2011 | Tibbitts et al. | |
| 2011/0077032 A1 | 3/2011 | Correale et al. | |
| 2011/0093161 A1 | 4/2011 | Zhou et al. | |
| 2011/0105097 A1 | 5/2011 | Tadayon et al. | |
| 2011/0111724 A1 | 5/2011 | Baptiste | |
| 2011/0130132 A1 | 6/2011 | Lipovski | |
| 2011/0136480 A1 | 6/2011 | Osann | |
| 2011/0136509 A1 | 6/2011 | Osann | |

(Continued)

*Primary Examiner* — Joseph Arevalo

(57) ABSTRACT

A method and use are described for disabling certain wireless communication device functionalities based on input from the device's user-facing camera. More particularly, image data of the user is collected, image analysis is used to extract certain metrics about the user, and if those metrics are in violation of one or more thresholds one or more device functionalities are disabled. The functionality may be disabled for a period of time or until the user's image metrics fall below one or more thresholds. The disabled device functionalities may also be extended to connected peripheral devices. Finally, records of threshold violations resulting in disabled device functionality may be stored on the device or a database and made available to third parties.

5 Claims, 5 Drawing Sheets

(56) References Cited

U.S. PATENT DOCUMENTS

| | | |
|---|---|---|
| 2011/0195699 A1 | 8/2011 | Tadayon |
| 2011/0223939 A1 | 9/2011 | Osann |
| 2011/0254865 A1* | 10/2011 | Yee ................. G06F 3/013 345/661 |
| 2011/0294520 A1 | 12/2011 | Zhou et al. |
| 2011/0295458 A1 | 12/2011 | Halsey-Fenderson |
| 2012/0176232 A1 | 7/2012 | Bantz et al. |
| 2012/0214463 A1 | 8/2012 | Smith et al. |
| 2012/0289215 A1 | 11/2012 | Elliott |
| 2012/0329444 A1 | 12/2012 | Osann |

* cited by examiner

METHOD AND USE OF SMARTPHONE CAMERA TO PREVENT DISTRACTED DRIVING

CROSS-REFERENCE TO PRIORITY APPLICATION

This application hereby claims the benefit of U.S. Provisional Patent Application No. 61/809,364 for a "Method and Use of Smartphone Camera to Prevent Distracted Driving" (filed Apr. 6, 2013, at the United States Patent and Trademark Office), which is hereby incorporated by reference in its entirety.

FIELD OF THE INVENTION

The present invention relates generally to wireless communication devices, in particular, to techniques for disabling certain device functionalities based on input from the device's user-facing camera.

BACKGROUND

In the last several years, distracted driving behavior has grown to epidemic proportions. According to a recent study, distracted driving accounts for up to a quarter of all auto accidents. Specifically, texting while driving makes the driver 23 times more likely to get into an accident, and six times more likely to cause an accident than intoxicated driving. It causes over 4,000 teen deaths per year. In 2008 alone, crashes caused by distracted driving cost the U.S. economy over $40 billion, and this number is growing every year.

In response to the growing problem, over 42 states have passed laws making texting or cell-phone usage illegal while driving. Yet still one third of both adults and teens admit to texting while driving. While the laws are clear, enforcement is difficult if not impossible. The inefficacy of legislation makes it clear that technology for enforcement may be deemed necessary. In 2010, the Department of Transportation announced it was looking into requiring some form of technology that would disable phone usage while driving. The National Transportation Security Board called for similar action in 2011.

While the problem is well-understood, an effective, affordable, and practical solution has been lacking. Prior attempts to curb distracted driving include mobile phone apps, verbal or written pledges, radio frequency jamming techniques, or dedicated in-car camera installations.

Some shortcomings of the existing mobile phone apps include that they must be started manually by the user, making enforcement impossible. Similar drawbacks of a verbal pledge are obvious. Another common smartphone app requires the use of the mobile device's GPS receiver to tell if the vehicle is above a speed threshold. This solution has the unfortunate problem of quickly draining mobile phone battery life, as well as prevents passengers in the car (or taxi or train passengers) from legitimate phone use. These practical limitations are unpopular and thus lead to minimal usage.

Other applications involve showing the user a visual puzzle they must solve to unlock the phone. The presumption is that the user would not attempt to solve the visual challenge while driving. However, human behavior and the fact that studies show users still text while driving despite knowing the dangers and illegality, leads one to conclude that this solution could actually make the situation worse by further distracting the driver.

Radio frequency jamming solutions remain illegal according to the FCC. Other dedicated hardware implementations include a speed sensor installed in the vehicle that disables the phone. These solutions are costly, again reducing actual number of installations and thus effectiveness. Finally, some fleet operators essentially video record drivers on their routes, which must be reviewed post-trip and thus does not actually prevent distracted driving. What is needed is a method or device that blocks distracted driving, allows passenger usage, does not add to driver distraction, has minimal impact on battery life, and is low-cost. Methods that do not meet these requirements will likely never be installed, will increase accidents, or will be bypassed by users.

SUMMARY

The invention described is a method for using a smartphone camera, typically front-facing toward the user, to detect distracted driving and prevent mobile device use. When the user powers on the phone to see an incoming text message, or to compose an outgoing one, the invention (as one embodiment) is launched as a background application on the device. It begins the process by acquiring images of the user, typically as low frame rate video. A computer vision algorithm is launched that then determines, based on the video feed, where the user is looking.

One typical embodiment of the invention would be based on eye tracking. A decision is made by the program based on how often the user is looking at the phone and how often they are looking away to determine if the user is distracted. Typical visual behavior of a distracted driver is reflected in a high duty-cycle of looking away from the phone. Users who are passengers or not in a moving vehicle tend to look at the screen for long periods—often the entire duration of phone usage. The actual decision for whether the user is driving or not could be based on duty cycle, or on absolute measurements of passing time, etc. These could be based on human studies to maximize efficacy and reduce false positives.

Upon detection of distracted behavior, the application would block use of the phone. This can occur in many ways and is not a limiting factor on the invention. Possible methods to block usage would be to lock the screen and/or buttons from taking input. This could be locked out for a specific time, whereafter the user can try again if the vehicle is stopped or pulled over for a time. Another embodiment would be to lock the screen, which shall remain locked until the user can look at the device long enough to make a new visual determination that the user is indeed no longer driving. At no time shall the device block access to outgoing calls to emergency services, as a matter of safety.

Note that, given proper implementation and wise algorithm choices, doing facial, feature, or eye-tracking recognition will lead to lower power draw than other inventions which use GPS and velocity-triggered blockage. For GPS usage, one of the largest power draws in a mobile device, it must be always on to stay locked to satellite locations. The invention described herein only runs when the user presses a button on the device and thus does not have to run all the time. The majority of the power savings is recognized in this observation alone, but in addition, many algorithms exist which can reduce an image to lower resolution in which the feature detection may run much more efficiently. Surprisingly low resolution is required for eye tracking, and so the power usage is limited to the camera and a brief period of computation.

Probably the chief advantage of the invention described herein is low cost implementation. Many smartphones today already have all of the technology needed to implement the invention, but the front-facing camera is probably the most critical part. Fortunately, many smartphones sold today already include this feature, and the number is growing as the use of video chat becomes more popular. Additionally, hardware costs tend to come down over time. Furthermore, it is possible that parents of teenage children may wish to specifically purchase a smartphone with front-facing camera, should they desire the option of using the present invention for safety concerns. As such, a growing number of smartphones will require no additional hardware to implement the invention, thus lowering costs and encouraging more widespread adoption.

One additional application of the invention would be to tie insurance rates to installation and usage of the invention. As mentioned earlier, in addition to the human cost, there is a large annual fiscal cost to the economy caused by distracted driving accidents. It is in the insurance industry's interest to save on their costs and pass some of that on to the consumer in the form of lowered insurance premiums. One possible embodiment would be the application could contact the insurance agency's servers in the background, possibly weekly. This autonomous "pinging" would inform the agency that the application was still installed and in use and thus the reduced rates would still be in effect.

DETAILED DESCRIPTION

In one aspect, the present invention discloses the use of a wireless communication device's (e.g. a smartphone) user-facing camera and a method for analyzing the images generated by such a camera. The images are analyzed to determine the direction and duration of the user's gaze according to temporal, duty-cycle, or rate metrics. The user is considered distracted if one or more of the aforementioned metrics is in violation of one or more thresholds. When the user is considered distracted, one or more applications on the wireless communication device are disabled.

Figure 1:
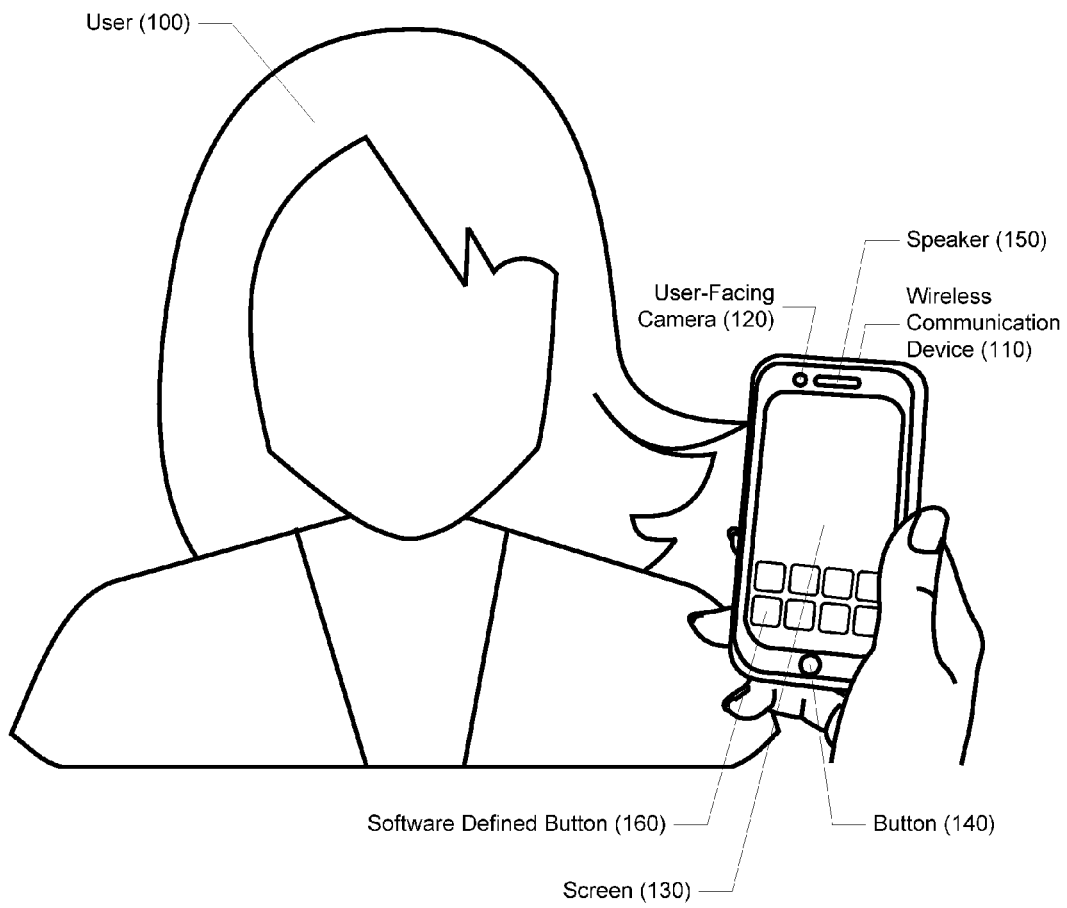
FIG. 1 is an exemplary depiction of the method and use where a single smartphone with user-facing camera is used to limit wireless communication device functionality.

FIG. 1 is an exemplary depiction of the method and use where a single smartphone with user-facing camera is used to limit wireless communication device functionality. The wireless communication device (110) typically comprises a screen (130), one or more hardware buttons (140), one or more software-defined buttons (160), one or more speakers (150), and one or more user-facing cameras (120). In an exemplary embodiment of the invention, visual data from the user-facing camera is used to determine when the user (100) is looking at or away from the device, and using that image and time data to decide if the user should be restricted from using the device. The underlying premise is that a user is using the device at the same time as performing another task (e.g. driving), will reflect that distraction in the measured duty-cycle or activity factor represented by the fraction of time spent looking toward or away from the device. Conversely, absolute time measurements of longer duration may be used to indicate focus on the device, and thus lack of distraction.

As depicted in FIG. 1, a user-facing camera is the camera of the wireless communication device whose field of view captures the user's face, head, and/or body. A wireless communication device may comprise multiple cameras. Depending on the construction and use of the wireless communication device, the user-facing camera may alternate. For example, a bi-fold smartphone may have a camera co-aligned with a touchscreen keypad that is usable when the smartphone is closed and a camera co-aligned with a physical keypad that is exposed when the smartphone is opened. In such smartphone designs, it is typical to only permit one keypad input at a time thus indicating which camera is the user-facing camera.

Any camera type may be used to capture both still and video images of the user, so long as the images produced provide sufficient detail to utilize image analysis algorithms to extract features comprising: the head, face, eyes, pupils, retina, nose, mouth, and ears. Such camera types include reflectance, fluorescence, thermal, hyperspectral, x-ray, or 3-dimensional image modalities and may feature multiple imaging modalities on the same camera.

The image analysis algorithms necessary for the disclosed invention must only output a binary decision of whether the user's gaze is or is not in the direction of the wireless communication device. Gaze is defined here as a combination of the direction of the user's face or the direction of the user's eyes. The image analysis algorithms must also have access to an accurate time base which can be obtained from the wireless communication device's system clock.

A detailed description of the specific image analysis algorithms described in paragraph 22 are beyond the scope of this patent disclosure.

The metrics obtained from the image analysis algorithms comprise temporal, duty-cycle, and rate metrics. Temporal metrics comprise 1) the amount of time the user's gaze is in the direction of the wireless communication device and 2) the amount of time the user's gaze is not in the direction of the wireless communication device. The duty-cycle metric is defined here as proportional to the ratio of time the user's gaze is in the direction of the wireless communication device versus the time the user's gaze is not in the direction of the wireless communication device. The rate metric is defined here as the number of times the user's gaze switches from looking at the wireless communication device to not looking at the wireless communication device per unit of time.

The metrics described in paragraph 26 are subject to one or more thresholds to determine when the user is considered distracted. The metrics may be combined using a multitude of techniques comprising: neural networks, genetic algorithms, Bayesian classification, or support vector machines. The resultant output of such classifiers is compared to one or more thresholds to determine if the user is or is not distracted.

In one embodiment of the disclosed method, the method would be applied to the wireless communication device by installation as an application with the option for removal by the user. In another embodiment of the method, the method would be applied to the wireless communication device by incorporation into the device's hardware, firmware, or operating system with little or no option for removal by the user.

Figure 2:
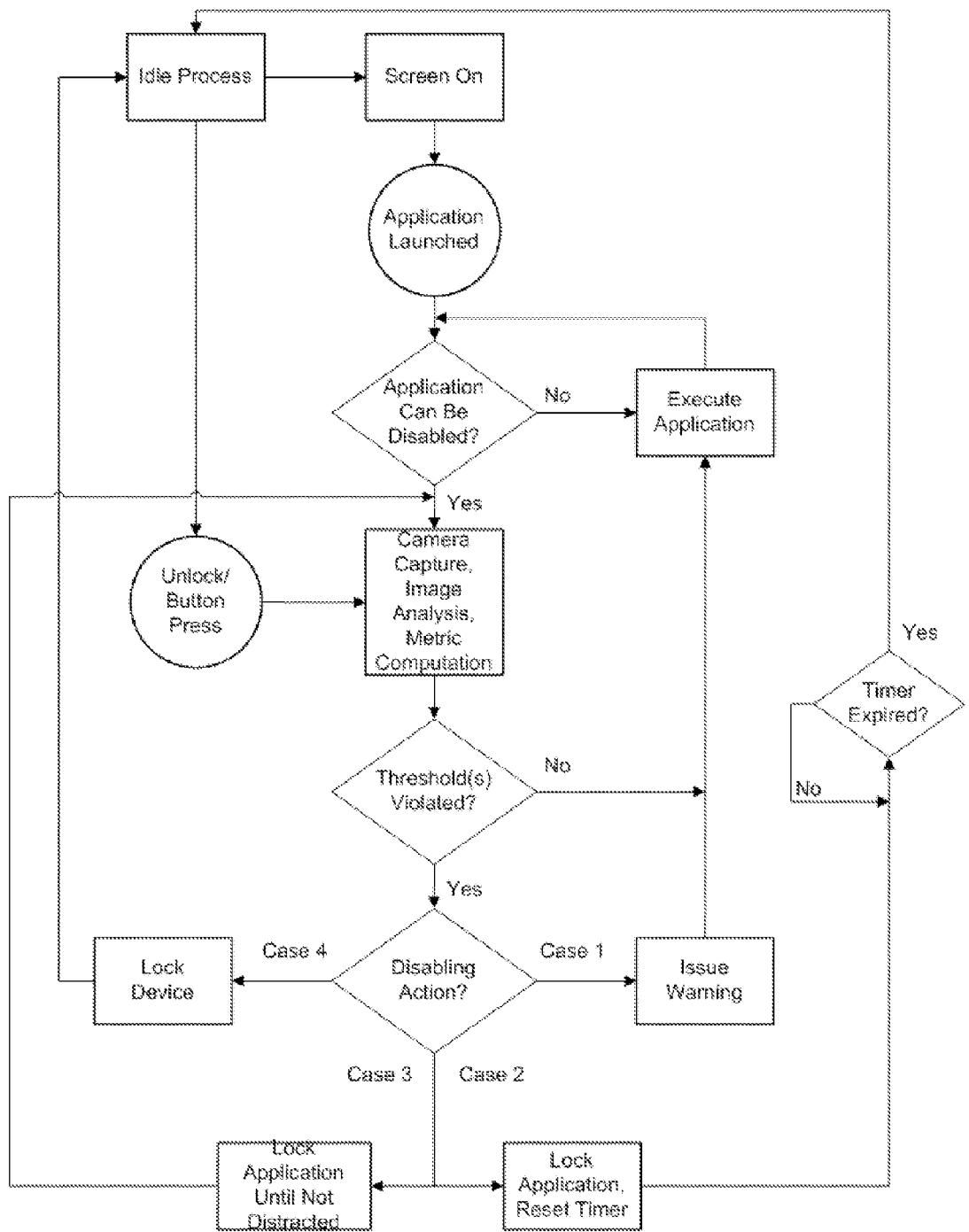
FIG. 2 is a flow chart of an exemplary process for limiting wireless communication device functionality based upon input from the user-facing camera according to an implementation described herein.

FIG. 2 is an exemplary depiction of a flow chart for operation of the disclosed method. The method is initiated when the user launches one or more applications installed on the wireless communication device or presses one or more buttons on the wireless communication device to unlock the device. It is first determined whether or not the desired action or application requires use of the disclosed method. For example, the first time the user attempts to unlock the device after an extended period of time would not require identifying if the user is distracted. However, if the device is locked because the user has been determined distracted, unlocking the device could require determining whether or not the user still appears distracted. In addition, a list of applications could be maintained by the wireless communication device which, when launched initiate the disclosed method for determining whether or not the user appears distracted. Such application, for example, may comprise texting, email, video, gaming, web browsing or other visually distracting applications. In another embodiment, all applications may be considered distracting. In yet another embodiment, an administrative user such as a parent or legal guardian may have the option to select which applications initiate the disclosed method and which are always permitted.

FIG. 2 also depicts several embodiments of the disclosed method of the resultant action that takes place when the user of the wireless communication device is determined to be distracted. In Case 1, the user simply receives an audio, visual, or tactile warning and use of the application is allowed to continue. This would provide feedback for the user and help prevent false-positives. This would also require the use of one or more threshold levels; the lower thresholds pertaining to discouragement warnings and the upper thresholds pertaining to disabling or impeding the use of the application. In Case 2, the user would be prevented from using the application for a preset period of time. Once the timer has expired the user would be permitted to begin the process again. In Case 3, the user would be prevented from using the application until they comply with the temporal, duty-cycle, or rate thresholds described in paragraphs 25 and 26. In Case 4, the user would be prevented from using any and all applications on the wireless communication device because the screen and/or device would be locked. One or more of the described cases may be implemented in the disclosed method. The choice of which case to utilize when a threshold violation occurs may be an option for the administrative user to select. Regardless of which case is utilized when the user is determine distracted, the disclosed method may require maintaining state information of which application is being used, which applications have priority, or the value of a lockout timer to ensure consistent operation.

The method in which an application is disabled, impeded, or discouraged may comprise: blocking incoming or outgoing data transmissions, deactivating or hiding the application icon, disabling the screen, disabling one or more hardware or software defined buttons, disabling one or more wireless transceivers, jamming one or more neighboring wireless transceivers, blocking data transmissions at the cellular base station or other network locations, charging a premium price or fee, or alerting third-parties. The method of disabling, impeding, or discouraging use of an application when the user is determined distracted may be a system setting accessible to an administrative user as described in paragraph 33.

In yet another embodiment of the disclosed method, the method may automatically prevent launching any other distracting applications while it is currently preventing, impeding, or discouraging the use of another application.

In any embodiment of the disclosed method, the method should not prevent emergency communication even when the user has been determined distracted. Emergency communication includes, but is not limited to: dialing 911, receiving mass-delivered emergency text messages, or activating one or more emergency applications that may be installed on the wireless communication device. To enable locking the screen and/or device while still permitting emergency use of the device, the disclosed method could implement its own screen lock process which provides said functionality.

In yet another embodiment of the disclosed method, the method comprises having an enabled and disabled functional state which is password protected. This enables the administrative user, such as a parent or legal guardian, to install an application which embodies the disclosed method onto the wireless communication device of a subordinate, such as a teenage child, thus preventing the subordinate from disabling the system. Password protection could also be applied to system settings, reporting settings, or third-party settings.

Figure 3:
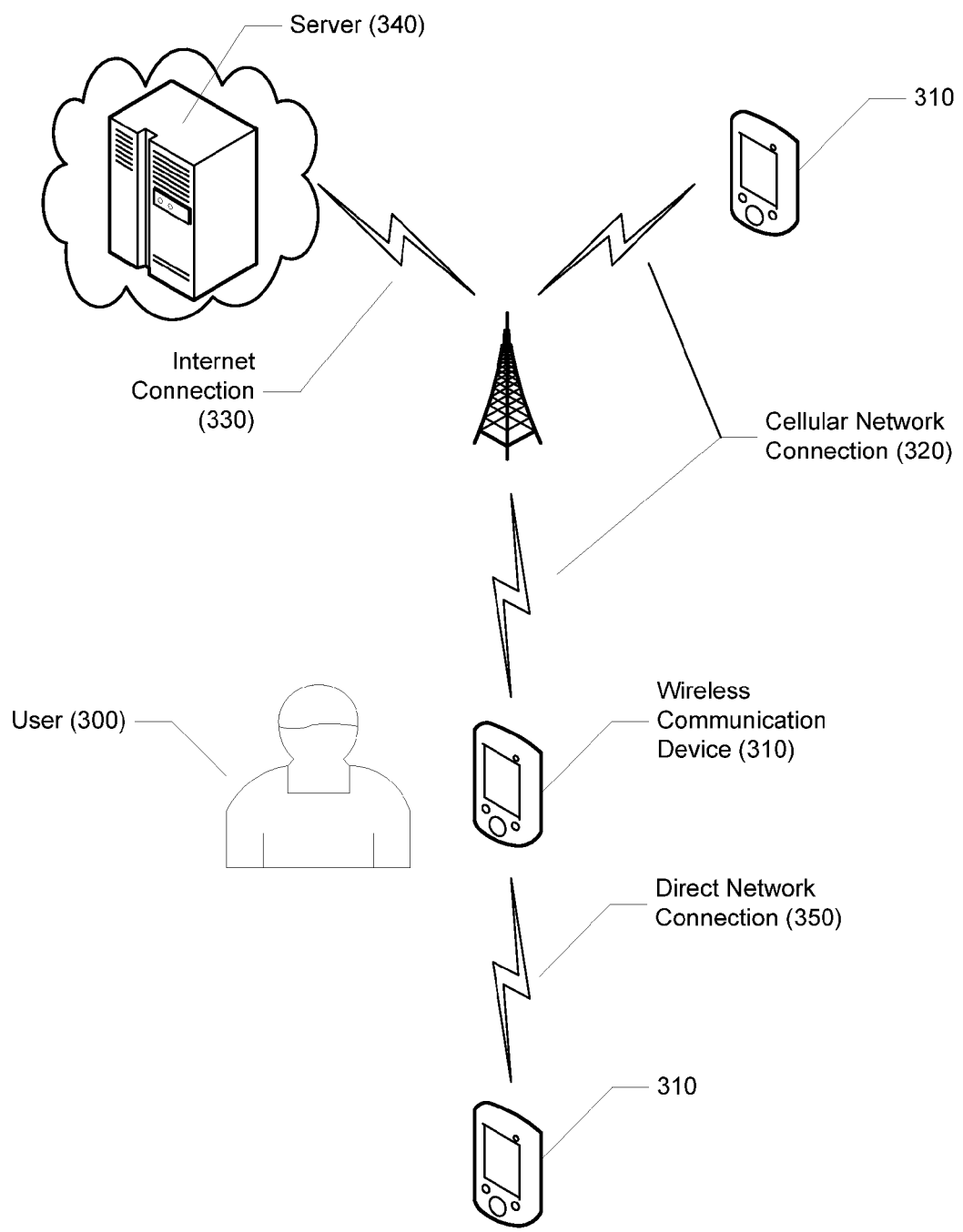
FIG. 3 is an exemplary depiction whereby the process for limiting wireless communication device functionality is not computed on the device itself, but on another network connected computing device and whereby the decision of such process is relayed to the wireless communication device.

FIG. 3 is an exemplary depiction whereby the process for limiting wireless communication device functionality is not computed on the device itself, but on another network connected computing device and whereby the decision of such process is relayed to the wireless communication device. When the user (300) of the wireless communication device (310) initiates the detection-determination algorithm, in addition to performing that process on the local device, it may also be computed on a separate wireless communication device which is connected directly through a wireless network (350), such as Bluetooth. Other exemplary embodiments also include a wireless communication device which is connected to the user device through a cellular network connection (320), as well as a computer server or microserver (340) connected to the cellular network through an internet connection (330), commonly referred to as the "cloud."

Figure 4:
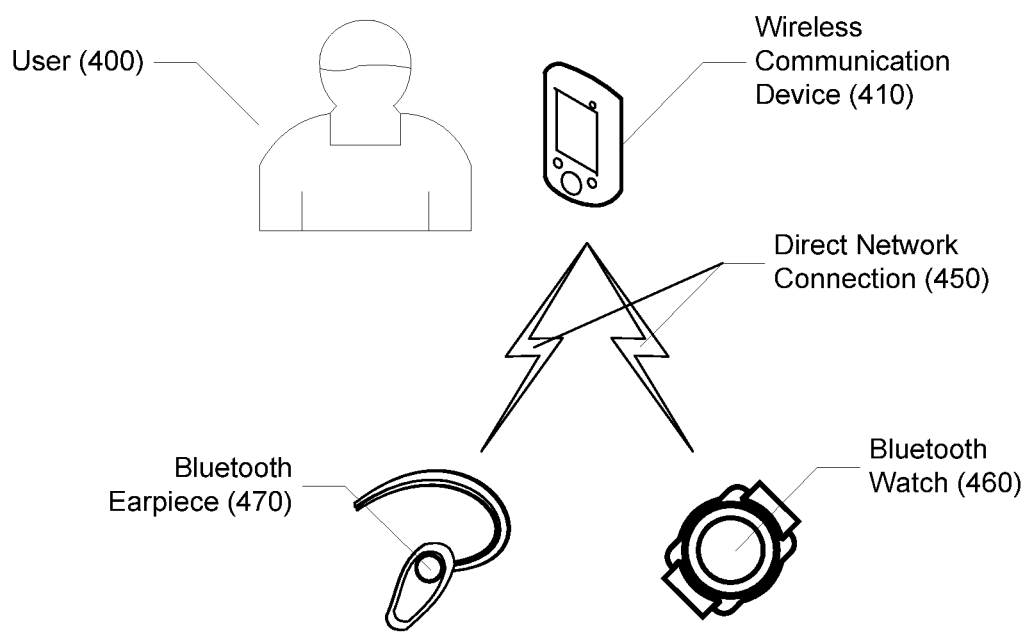
FIG. 4 is an exemplary depiction whereby the process for limiting wireless communication device functionality is also applied to connected peripheral devices.

FIG. 4 is an exemplary depiction whereby the process for limiting wireless communication device functionality is also applied to connected peripheral devices. When the user (400) of the wireless communication device (410) is found to be in violation of the temporal, duty-cycle, or rate thresholds, non-transitory computer readable code on said device prevents, impedes, or discourages the use of one or more applications on a network-connected device such as an earpiece (470) or watch (460). Said connected devices may be paired with the wireless communication device over a direct network connection (450), exemplary embodiments of which may include Bluetooth, Wi-Fi, Zigbee, Wireless USB, or other embodiments of a Wireless Personal Area Network (WPAN) not limited to the examples given herein.

Figure 5:
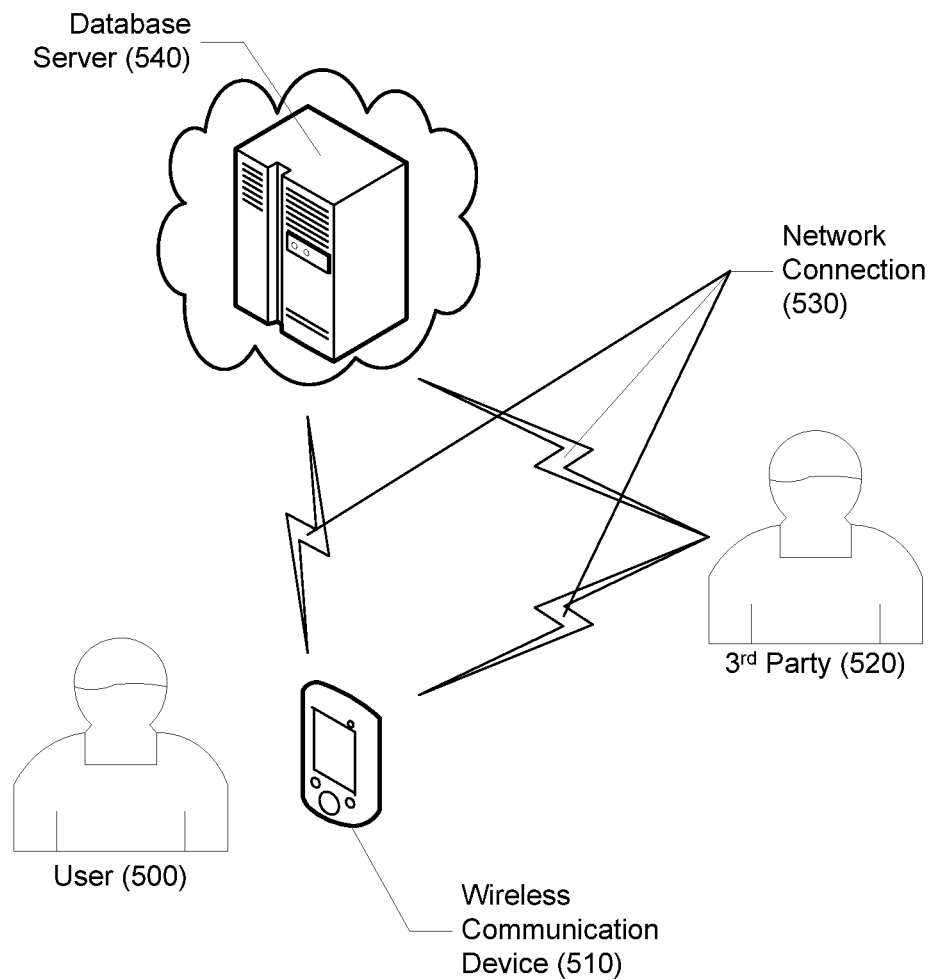
FIG. 5 is an exemplary depiction whereby records of the process for limiting wireless communication device functionality are made available to third parties via either access to the records stored on the wireless communication device or records stored on a database.

FIG. 5 is an exemplary depiction whereby records of the user's (500) detected violations or infractions on the wireless communication device (510) are made available to third parties (520) via either access to the records stored directly on the wireless communication device or records stored on a computer database (540). Third party access may be through direct communication with the wireless device over a network connection (530) or through a network connection access to the computer database, which in turn may be connected to the wireless communication device through a network connection. Exemplary embodiments of a third party may comprise an insurance agency, parents, or custodial guardians, as some examples. Exemplary embodiments of the database server include a computer webserver or microserver which may be owned or operated by the insurance agency, the wireless communication device manufacturer, or another party. Exemplary embodiments of records to be shared may comprise the time of each violation, the application or process prevented, the duty-cycle time measurements themselves or overages over the thresholds, the header information of incoming or outgoing text messages, the version number of the installed detection software, firmware environment information of the wireless communication device, vehicle speed measurements at the time of a violation, or some combination of these or more, not limited to the examples given herein.

The invention claimed is:

1. A method of restricting access to at least one application on a wireless communication device, comprising steps of:
   obtaining image data of a user of the wireless communication device with a camera sensor operatively coupled to the wireless communication device;
   then, performing image analysis of image data, on a processor operatively coupled to the wireless communication device, to calculate at least one of the following metrics:
      A. a duration of a user's gaze in the direction of the wireless communication device's camera sensor,
      B. a rate of the user's gaze from a first direction, defined as towards the wireless communication device's camera sensor, to a second direction, defined as towards anywhere but the wireless communication device's camera sensor, with respect to time, and
      C. a duty cycle of the user's gaze from a first direction, defined as towards the wireless communication device's camera sensor, to a second direction, defined as towards anywhere but the wireless communication device's camera sensor,
   then, generating a composite probability calculation as to whether the user of the wireless communication device is distracted, the composite probability calculation is defined as a weighted mathematical combination of probabilities, wherein the probabilities to be combined are the probabilities resulting from comparing the duration, rate, and duty cycle metrics that were calculated, each to a corresponding threshold,
   then, comparing the composite probability calculation to a probability threshold, resulting in one of two outcomes:
      A. the user of the wireless communication device is not distracted, at which point the wireless communication device permits access to at least one application on the wireless communication device, and
      B. the user of the wireless communication device is distracted, at which point the wireless communication device performs at least one of:
         restricting access to at least one application on the wireless communication device,
         alerting the user of the wireless communication device, and
         alerting third-parties using a communications protocol supported by the wireless communication device;
   then, repeating the method based on a selectable time interval.

2. The method as claimed in claim 1 further comprises executing the method based on an enabled and disabled functional status which is password protected.

3. The method as claimed in claim 1 further comprises executing the method when the user of the wireless communication device activates at least one application on at least one of:
   the same wireless communication device, and an operatively coupled wireless communication device.

4. The method as claimed in claim 1 wherein the obtaining image data step is accomplished using a user-facing camera of the wireless communication device, and wherein captured image data comprises images selected from a group consisting of at least one of a user's face, head, and body.

5. The method as claimed in claim 1 wherein the obtaining image data step is accomplished using a user-facing camera of the wireless communication device, and wherein the camera type comprises modalities selected from a group consisting of at least one of reflectance, fluorescence, thermal, infrared, hyperspectral, x-ray, and 3-dimensional image modalities.

* * * * *